United States Patent
Hagihara et al.

(10) Patent No.: US 12,498,330 B2
(45) Date of Patent: Dec. 16, 2025

(54) MANAGEMENT DEVICE FOR MATERIAL TESTING MACHINE BY ACQUIRING CAPTURED IMAGE OF A CONTROL DEVICE, MANAGEMENT SYSTEM AND MANAGEMENT METHOD THEREOF

(71) Applicant: Shimadzu Corporation, Kyoto (JP)

(72) Inventors: Daisuke Hagihara, Kyoto (JP); Taiki Nishimura, Kyoto (JP); Tohru Matsuura, Kyoto (JP); Shota Maki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 410 days.

(21) Appl. No.: 17/881,594

(22) Filed: Aug. 4, 2022

(65) Prior Publication Data
US 2023/0081934 A1  Mar. 16, 2023

(30) Foreign Application Priority Data
Sep. 15, 2021 (JP) ................. 2021-149852

(51) Int. Cl.
*G01N 21/88* (2006.01)
*G06F 11/22* (2006.01)
*H04N 7/18* (2006.01)

(52) U.S. Cl.
CPC ..... *G01N 21/8851* (2013.01); *G06F 11/2294* (2013.01); *H04N 7/183* (2013.01); *G01N 2021/8887* (2013.01)

(58) Field of Classification Search
CPC ........ G01N 21/8851; G01N 2021/8887; G06F 11/2294; H04N 7/183; H04N 7/181
See application file for complete search history.

(56) References Cited

U.S. PATENT DOCUMENTS

| | | | |
|---|---|---|---|
| 10,445,202 B2 | 10/2019 | Frenz | |
| 10,671,503 B2 | 6/2020 | Frenz et al. | |
| 2013/0038633 A1* | 2/2013 | Maggiore | G01N 15/0826 29/407.01 |
| 2015/0095717 A1 | 4/2015 | Frenz et al. | |
| 2016/0014133 A1* | 1/2016 | Kanga | G06V 20/46 726/4 |
| 2018/0307045 A1* | 10/2018 | Nishi | G02B 27/017 |
| 2019/0138748 A1* | 5/2019 | Long | H04N 7/183 |
| 2019/0266346 A1* | 8/2019 | O'Brien | G06V 20/176 |
| 2019/0332514 A1* | 10/2019 | Frenz | G06F 11/2294 |
| 2020/0042837 A1* | 2/2020 | Skinner | H04L 63/102 |
| 2024/0022806 A1* | 1/2024 | Kudo | G06T 7/74 |
| 2024/0231304 A1* | 7/2024 | Uwano | G06Q 10/06 |

FOREIGN PATENT DOCUMENTS

JP         2016541036         12/2016

* cited by examiner

*Primary Examiner* — Rami R Okasha
(74) *Attorney, Agent, or Firm* — JCIPRNET (57) ABSTRACT

This management device for a material testing machine includes: an acquisition unit that acquires at least either a captured image of a material testing machine body or a captured image of a control device that causes the material testing machine body to execute a test; and a data-processing unit that associates the captured image with the material testing machine and stores a result in an image storage unit.

6 Claims, 9 Drawing Sheets

| TESTING MACHINE ID | CAMERA ID | IMAGE SAVE DESTINATION | TRANSMISSION RESTRICTION INFORMATION |
|---|---|---|---|
| 0001 | 001 | FIRST | TEST CONDITIONS, TEST DATA |
| | 002 | FIRST | |
| 0002 | 003 | FIRST, SECOND | TEST CONDITIONS, TEST DATA |
| | 004 | FIRST, SECOND | |

MANAGEMENT DEVICE FOR MATERIAL TESTING MACHINE BY ACQUIRING CAPTURED IMAGE OF A CONTROL DEVICE, MANAGEMENT SYSTEM AND MANAGEMENT METHOD THEREOF

CROSS REFERENCE

The present application claims priority under 35 U.S.C. § 119 to Japanese Patent Application No. 2021-149852 filed on Sep. 15, 2021. The content of the application is incorporated herein by reference in its entirety.

BACKGROUND

Technical Field

The present disclosure relates to a management device for a material testing machine, a management system for a material testing machine, and a management method for a material testing machine.

Related Art

Conventionally, a technology for managing the operating state and test data of a material testing machine by computer has been proposed. For example, JP 2016-541036 A discloses a remote platform that acquires data related to the status of a test device and test data by communicating with the test device.

SUMMARY

The configuration disclosed in JP 2016-541036 A requires the data communication function of a material testing machine. That is, it has not been possible to remotely manage a material testing machine having no communication function. In order to check the operating state and test data of such material testing machine, it is necessary for a user to go to the installation location of the material testing machine.

A management device for a material testing machine according to an embodiment the present disclosure includes: an acquisition unit that acquires at least either a captured image of a material testing machine body or a captured image of a control device that causes the material testing machine body to execute a test; and a data-processing unit that associates the captured image with the material testing machine and stores a result in an image storage unit.

A management system for a material testing machine according to an embodiment of the present disclosure includes: an imaging unit including at least either a first camera that captures an image of a material testing machine body or a second camera that captures an image of a control device that causes the material testing machine body to execute a test; an acquisition unit that acquires a captured image from the imaging unit; an image storage unit; a data-processing unit that associates the captured image acquired by the acquisition unit with the material testing machine and stores a result in the image storage unit; a communication unit that communicates with a terminal device; and an image transmission control unit that, in response to a request from the terminal device, transmits the captured image stored in the image storage unit to the terminal device.

A management method for a material testing machine according an embodiment of the present disclosure includes: acquiring at least either a captured image of a material testing machine body or a captured image of a control device that causes the material testing machine body to execute a test; associating the captured image with the material testing machine and storing a result in an image storage unit; and executing communication with a terminal device, and in response to a request from the terminal device, transmitting the captured image stored in the image storage unit to the terminal device.

DETAILED DESCRIPTION

An embodiment of the present disclosure is to reduce a burden on a user for managing the state of a material testing machine.

With the management device for a material testing machine, the management system for a material testing machine, and the management method for a material testing machine according to the embodiments, it is possible to manage the material testing machine using a captured image of the material testing machine or the control device. This reduces the need for a user who manages the material testing machine to go to the installation location of the material testing machine, thereby allowing a reduction in the burden for managing the material testing machine.

1. Configuration of Management System

Figure 1:
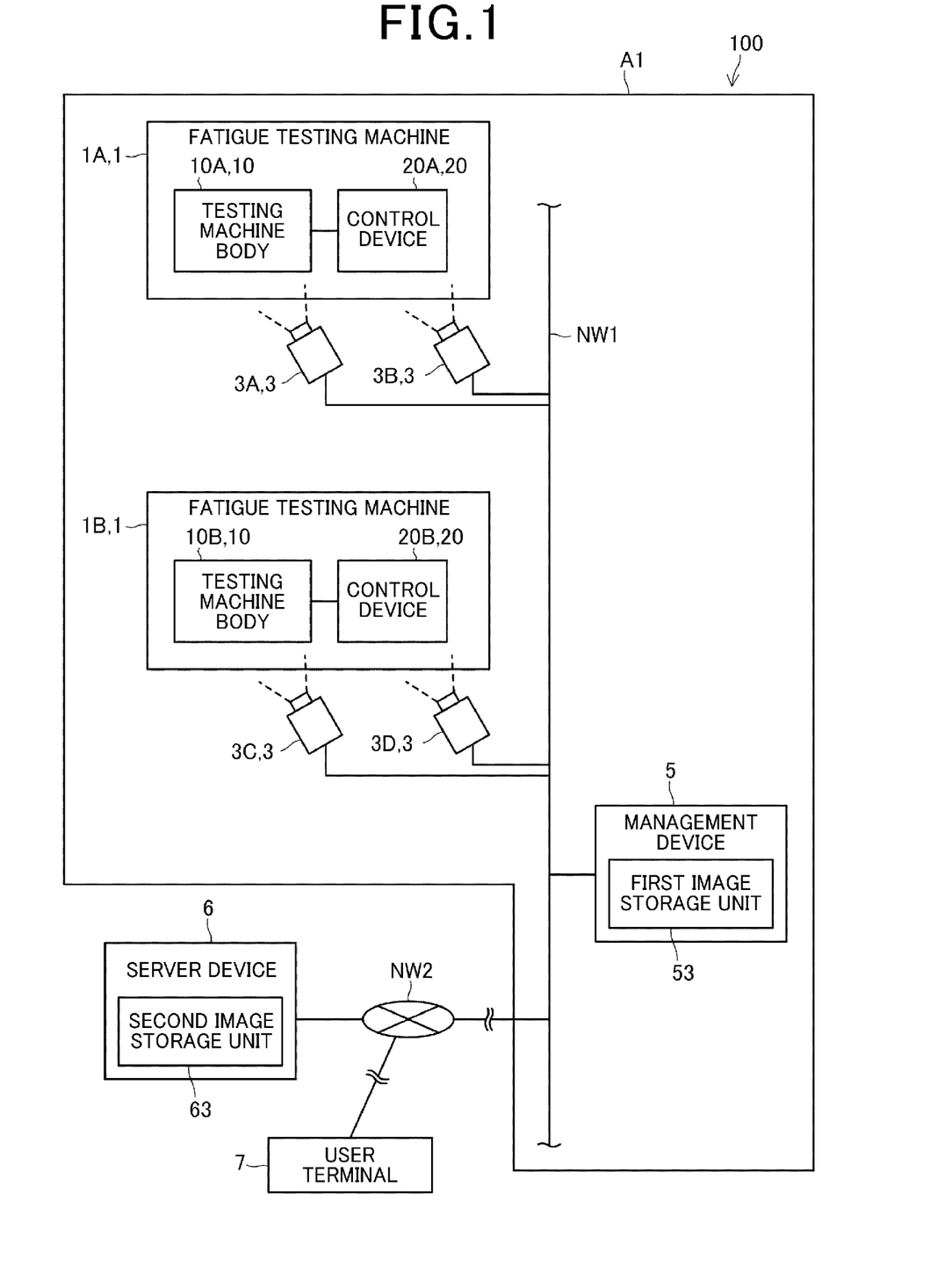
FIG. 1 illustrates an example of the schematic configuration of a management system for a fatigue testing machine.

FIG. 1 illustrates an example of the schematic configuration of a management system 100 according to an embodiment of the present disclosure.

The management system 100 is designed to manage a plurality of fatigue testing machines 1. FIG. 1 illustrates a configuration in which the management system 100 manages two fatigue testing machines 1A and 1B. The number of the fatigue testing machines 1 is not limited, and the management system 100 may manage a single fatigue testing machine 1, or the fatigue testing machine 1 can also manage three or more fatigue testing machines 1. The management system 100 corresponds to an example of the management system for a material testing machine. The fatigue testing machine 1 corresponds to an example of the material testing machine.

The fatigue testing machine 1 is provided with a testing machine body 10 and a control device 20. The control device 20 is, for example, a computer including a processor and memory (not illustrated). The fatigue testing machine 1 executes a fatigue test on a specimen SP by controlling the testing machine body 10 by means of the control device 20. For example, the fatigue testing machine 1 repeatedly applies tensile stress σ to the specimen SP. The tensile stress σ and the number of repetitions are set in advance. The number of repetitions is, for example, $10^2$ to $10^8$.

The fatigue testing machine 1 is provided with the testing machine body 10 and the control device 20 that causes the testing machine body 10 to execute a test. The fatigue testing machines 1A and 1B have substantially the same configuration. In the present embodiment, the fatigue testing machines 1A and 1B are referred to as the fatigue testing machine 1 when not distinguished. Similarly, testing machine bodies 10A and 10B are described as the testing machine body 10 when not distinguished, and control devices 20A and 20B are described as the control device 20 when not distinguished. The testing machine body 10 corresponds to an example of a material testing machine body. The testing machine body 10A corresponds to an example of a first material testing machine body, and the testing machine body 10B corresponds to an example of a second material testing machine body. The control device 20A corresponds to an example of a first control device, and the control device 20B corresponds to an example of a second control device.

A testing machine installation area A1 is a location where the fatigue testing machine 1 is installed and a region that can be regarded as being equivalent to that location, from the viewpoint of information security. The testing machine installation area A1 is not a concept referring only to a physical location, but is a logical region enabling protection of information. For example, in a case where the entrance and exit of people are managed in a building or the like where the fatigue testing machine 1 is installed, the building or the like where the fatigue testing machine 1 is installed can be set as the testing machine installation area A1. In this case, the testing machine installation area A1 is a limited region including the installation location of the fatigue testing machine 1, and may be a separated area inside one building, may be the entire one building, or may include a plurality of buildings. The testing machine installation area A1 may include a plurality of locations physically separated from each other. The information network connecting these locations is required to be a closed network or a private network. The information network may include a dedicated line or a virtual private network (VPN).

The management system 100 is provided with a plurality of cameras 3, a management device 5, and a server device 6.

Although the number of cameras 3 included in the management system 100 is not limited, the management system 100 is provided with at least one camera 3 per fatigue testing machine 1 to be managed.

In the example illustrated in FIG. 1, the management system 100 is provided with cameras 3A and 3B for capturing images of the fatigue testing machine 1A, and cameras 3C and 3D for capturing images of the fatigue testing machine 1B. The camera 3A captures an image of a range including the testing machine body 10A, and the camera 3B captures an image of a range including the control device 20A. The camera 3C captures an image of a range including the testing machine body 10B, and the camera 3D captures an image of a range including the control device 20B. The camera 3 corresponds to an example of an imaging unit. The cameras 3A and 3C for capturing images of the testing machine body 10 correspond to an example of a first camera, and the cameras 3B and 3D for capturing images of the control device 20 correspond to an example of a second camera.

The cameras 3A, 3B, 3C, and 3D are digital cameras that capture images of a predetermined imaging range. The cameras 3A, 3B, 3C, and 3D may be digital still cameras that capture still images or digital video cameras that capture videos. The cameras 3A, 3B, 3C, and 3D may have substantially the same configuration. In the present embodiment, the cameras 3A, 3B, 3C, and 3D are referred to as the camera 3 when not distinguished.

The camera 3 has a communication function and executes data communication via a network NW1. Upon capturing an image of the fatigue testing machine 1, the camera 3 transmits the captured image data to the management device 5 via the network NW1.

The camera 3 may have no communication function. In this case, the camera 3 is connected to a computer (not illustrated). The computer connected to the camera 3 has the communication function of executing data communication via the network NW1 and the function of controlling the camera 3. Examples thereof include a personal computer, a tablet computer, and a smartphone. In this case, the camera 3 captures images according to the control of the computer, and the computer transmits the image data captured by the camera 3 to the management device 5.

The network NW1 is a local network installed in the testing machine installation area A1. The network NW1 is a private network including a local area network (LAN) or the like. The network NW1 includes, for example, an Ethernet (registered trademark) standard cable, a server device (not illustrated), a router, and a gateway. The network NW1 may include a wireless communication line such as Wi-Fi (registered trademark).

A network NW2 is a wide area communication network connectable from an area other than the testing machine installation area A1, and is a so-called wide area network (WAN). The network NW2 may be a global network such as the Internet, or may include one or more networks connected to the Internet. The network NW2 and the network NW1 are connected via a router or gateway (not illustrated), or another communication network.

The management device 5 is a computer having a communication function, and is installed in the testing machine installation area A1. The management device 5 executes data communication with the camera 3 and the server device 6.

The server device 6 is a server computer having a communication function, and executes data communication with the management device 5. The server device 6 may include a plurality of server computers, and may be, for example, a cloud server. The server device 6 is provided with a second image storage unit 63 (memory). The second image storage unit 63 includes a hard disk drive (HDD), a solid state drive (SSD), or the like, and stores data in a nonvolatile manner. The server device 6 receives data from management device 5, and stores the received data in the second image storage unit 63. The server device 6 corresponds to an example of a second storage device.

The server device 6 can execute communication with a user terminal 7. The user terminal 7 is a terminal device used by a user of the management system 100. Specifically, the user terminal 7 is a computer having a communication function, and is, for example, a personal computer, a tablet computer, or a smartphone. The user terminal 7 executes data communication with the server device 6 according to a user's operation. The user terminal 7 corresponds to an example of a terminal device.

2. Configuration of Fatigue Testing Machine

Figure 2:
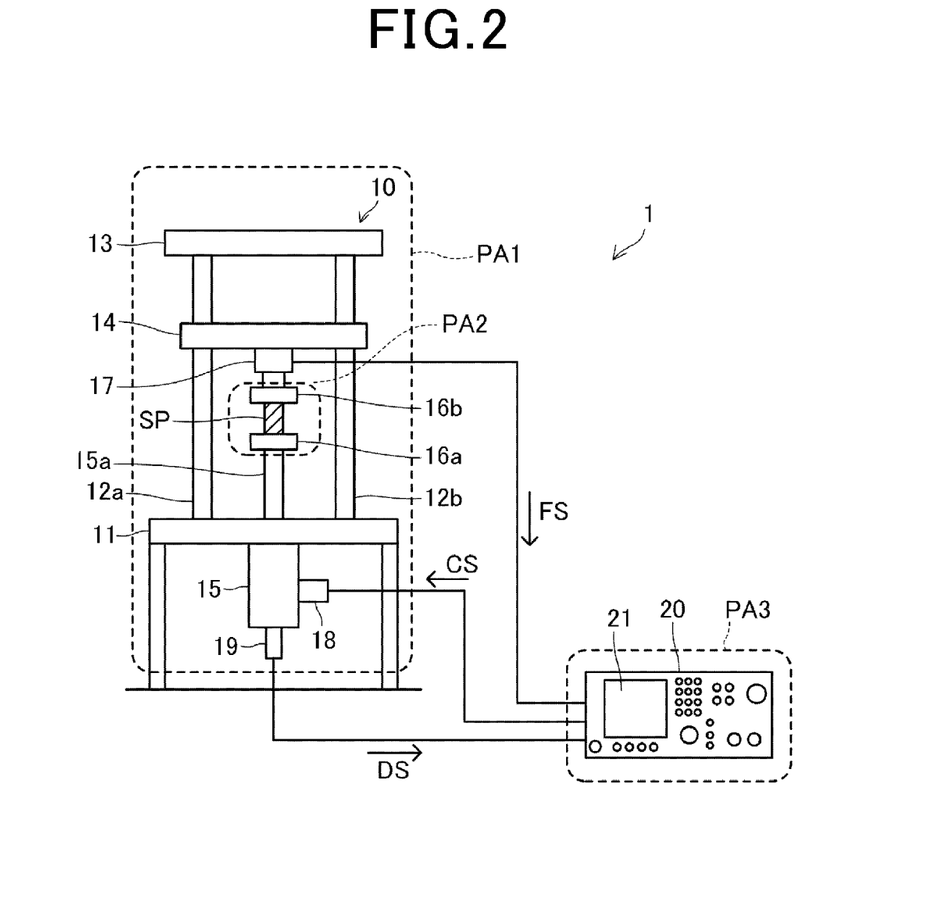
FIG. 2 illustrates an example of the configuration of the fatigue testing machine.

FIG. 2 illustrates an example of the configuration of the fatigue testing machine 1. The configuration in FIG. 2 is common to the fatigue testing machine 1A and the fatigue testing machine 1B.

The testing machine body 10 executes a fatigue test on the specimen SP according to an instruction from the control device 20. The control device 20 controls the operation of the testing machine body 10.

As illustrated in FIG. 2, the testing machine body 10 is configured by a load frame being formed on a base 11 by a pair of pillars 12a and 12b and a yoke 13, and a crosshead 14 being fixed to the pillars 12a and 12b.

A hydraulic actuator 15 is disposed on the base 11, and a lower jig 16a for fixing the lower end of the specimen SP is attached to a piston rod 15a of the hydraulic actuator 15. Furthermore, an upper jig 16b for fixing the upper end of the specimen SP is attached to the crosshead 14 with a load cell 17 interposed therebetween. The lower jig 16a and the upper jig 16b are each provided with a chuck mechanism that grips the specimen SP.

The load cell 17 detects a test force acting on the specimen SP.

The hydraulic actuator 15 is controlled as to the direction and amount of pressure oil by a servo valve 18, and the piston rod 15a expands and contracts. As a result, the test force is applied to the specimen SP fixed between the upper jig 16b and the lower jig 16a. The stroke of the hydraulic actuator 15, that is, the displacement of the specimen SP, is detected by a differential transformer 19 that is attached to the hydraulic actuator 15.

An electric power supply and a hydraulic power supply, not illustrated, are provided in the testing machine body 10. The electric power supply supplies power to each part of the testing machine body 10. The electric power supply supplies power to, for example, various motors and drives the motors. The hydraulic power supply supplies hydraulic pressure to a hydraulic device that constitutes the testing machine body 10. The hydraulic power supply, for example, supplies hydraulic pressure to the hydraulic actuator 15 and drives the hydraulic actuator 15. That is, the hydraulic actuator 15 is driven by the hydraulic pressure supplied from the hydraulic power supply, and the piston rod 15a is expanded and contracted. The hydraulic power supply is provided with, for example, a hydraulic pump and a hydraulic control valve, and generates hydraulic pressure by driving the hydraulic pump. The hydraulic control valve adjusts the hydraulic pressure output from the hydraulic power supply. The hydraulic pump and the hydraulic control valve are supplied with electric power from the electric power supply.

The control device 20 acquires a test force signal FS output from the load cell 17 and generates test force information by A/D conversion of the test force signal FS. The control device 20 acquires a displacement signal DS output from the differential transformer 19 and generates displacement information by A/D conversion of the displacement signal DS. The control device 20 generates command information based on the test force information and the displacement information. The control device 20 generates a command signal CS by D/A conversion of the command information and outputs the generated command signal CS to the servo valve 18.

The servo valve 18 controls the direction and amount of pressure oil to the hydraulic actuator 15 according to the command signal CS output from the control device 20.

The control device 20 has a display 21. The display 21 is a display screen including a liquid crystal display (LCD) display panel or the like. The control device 20 displays, on the display 21, data based on the test force information and displacement information acquired from the testing machine body 10 and data based on the command information output to the testing machine body 10.

In the configuration of FIG. 2, an amplifier that amplifies each of the test force signal FS, the displacement signal DS, and the command signal CS may be disposed between the testing machine body 10 and the control device 20.

The camera 3 that captures images of the testing machine body 10 captures images of an imaging range PA1 or an imaging range PA2. The imaging range PA1 includes almost the entire testing machine body 10. The imaging range PA1 may not include the lower portion of the testing machine body 10. The imaging range PA2 includes the specimen SP mounted on the testing machine body 10. More specifically, the imaging range PA2 includes the upper jig 16b, the lower jig 16a, and the specimen SP. The camera 3 that captures images of the control device 20 captures images of, for example, an imaging range PA3. The imaging range PA3 includes at least the display 21, and may include the entire surface of the housing of the control device 20 on which the display 21 is disposed.

Images of several of the imaging ranges PA1, PA2, and PA3 may be captured by a single camera 3. For example, the camera 3 that captures images of the imaging range PA1 may generate captured images of the imaging range PA2 by means of an optical zoom function or a digital zoom function.

In this embodiment, the control device 20 is described as a device having the housing in which the display 21 and various switches described below are arranged, but the control device 20 may include, for example, a personal computer. In this case, the display 21 is a display connected to or included in the personal computer.

3. Configuration of Management Device

Figure 3:
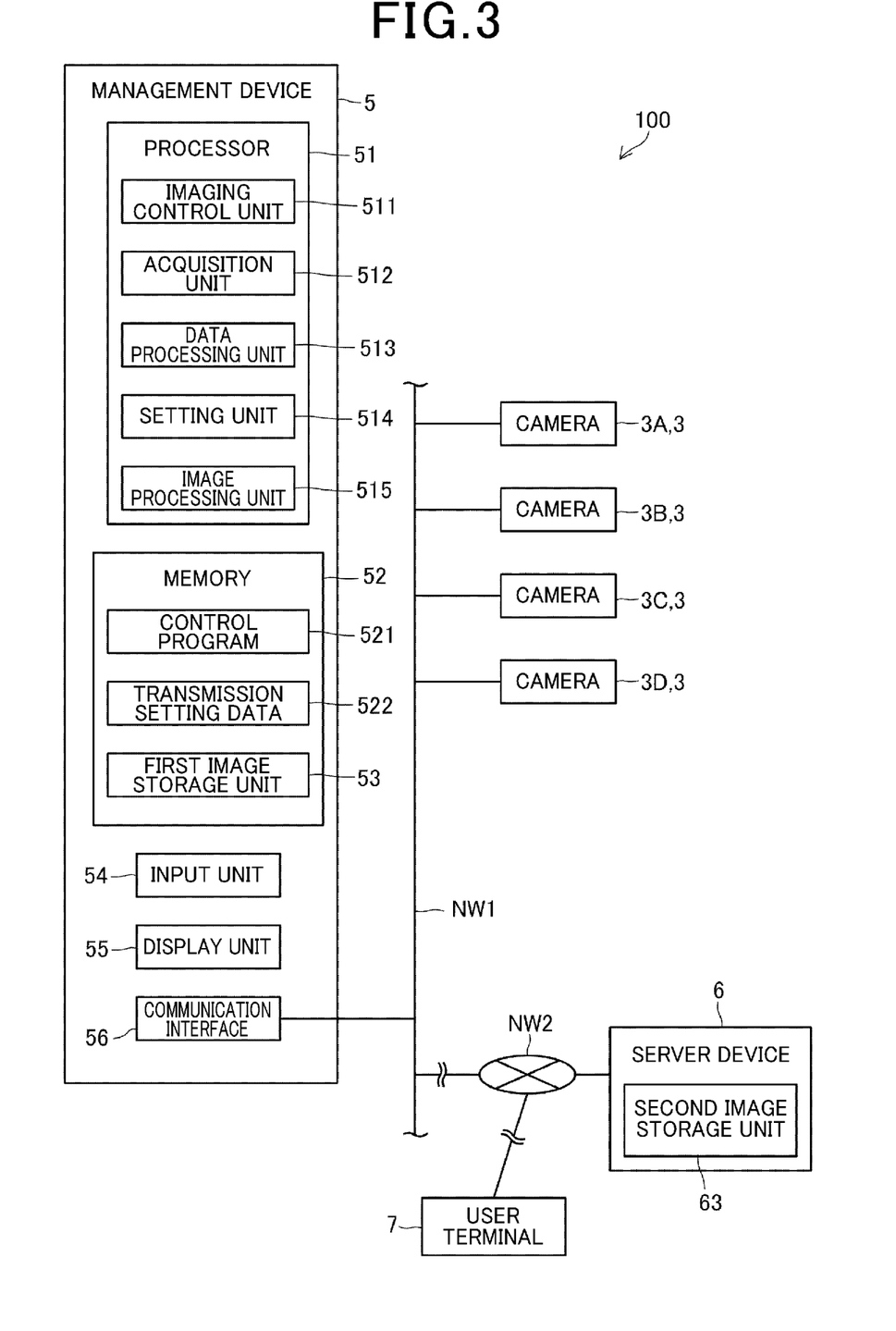
FIG. 3 is a block diagram illustrating an example of the management system.

FIG. 3 is a block diagram illustrating an example of the management system 100, and particularly illustrates the configuration of the management device 5 in detail.

The management device 5 is provided with a processor 51, a memory 52, an input unit 54, a display unit 55, and a communication interface 56.

The management device 5 includes a personal computer or a server computer. The management device 5 may include one or more appropriate circuits such as an integrated circuit, e.g., an IC chip or an LSI. Furthermore, the management device 5 may include, for example, a tablet terminal, a smartphone, or the like.

The processor 51 includes a central processing unit (CPU), a micro-processing unit (MPU), and the like. The memory 52 includes a read only memory (ROM), a random access memory (RAM), and the like.

The management device 5 is provided with an imaging control unit 511, an acquisition unit 512, a data-processing unit 513, a setting unit 514, and an image-processing unit 515. Specifically, the processor 51 of the management device 5 functions as the imaging control unit 511, the acquisition unit 512, the data-processing unit 513, the setting unit 514, and the image-processing unit 515 by executing a control program 521 stored in the memory 52.

The memory 52 stores the control program 521 and transmission setting data 522. In addition, the memory 52 has a first image storage unit 53. Specifically, the processor 51 executes the control program 521, thereby causing the memory 52 to function as the first image storage unit 53.

The input unit 54 is provided with various switches and keys used by the user. The input unit 54 may be connected to an input device used by the user, and may be configured so as to accept user input by detecting an operation on the input device. Examples of the input device include a pointing device such as a mouse or a trackpad, and a keyboard.

The display unit 55 is provided with a display such as an LCD display panel. The display unit 55 displays the processing situation and setting contents related to the images captured by the camera 3 according to the control of the processor 51. The input unit 54 may be provided with a touch sensor that is overlaid on the display surface of the display unit 55.

The communication interface 56 is connected to the network NW1 and communicates with the camera 3 via the network NW1. The communication interface 56 is provided with, for example, a connector to which a communication cable can be connected and a communication circuit. The communication interface 56 may be configured with a wireless communication interface to execute wireless communication. In addition, the communication interface 56 executes data communication via the network NW1 and the network NW2.

The imaging control unit 511 communicates with the camera 3 via the network NW1 and requests the camera 3 to capture images. In a case where the camera 3 has the function of capturing images at a preset cycle or at a preset timing, the management device 5 may be configured without the imaging control unit 511.

The acquisition unit 512 acquires the images captured by the camera 3. Specifically, the acquisition unit 512 communicates with the camera 3 by means of the communication interface 56, and acquires the captured image data output from the camera 3.

A testing machine ID is assigned to the fatigue testing machine 1 to be managed by the management system 100. The testing machine ID is information that enables identification of each of the fatigue testing machines 1. Furthermore, a camera ID is assigned to the camera 3 included in the management system 100. The camera ID is information that enables identification of each of the cameras 3. The acquisition unit 512 acquires, from the camera 3, the camera ID of the camera 3 and the testing machine ID of the fatigue testing machine 1 captured by the camera 3, together with the captured image. When acquiring a captured image from the camera 3, the acquisition unit 512 may identify whether the captured image to be acquired is a captured image of the testing machine body 10 or the control device 20. In addition, when acquiring a captured image from the camera 3, the acquisition unit 512 may identify which of the imaging ranges PA1, PA2, and PA3 the captured image to be acquired corresponds to.

The data-processing unit 513 stores the captured images acquired by the acquisition unit 512 in the first image storage unit 53 and/or the second image storage unit 63 on the basis of the transmission setting data 522.

The setting unit 514 configures settings related to processing for storing the captured images in the first image storage unit 53 and the second image storage unit 63. For example, the setting unit 514 causes the display unit 55 to display a setting screen used by the user to make settings, and generates the transmission setting data 522 on the basis of the contents inputted using the setting screen.

Figure 4:
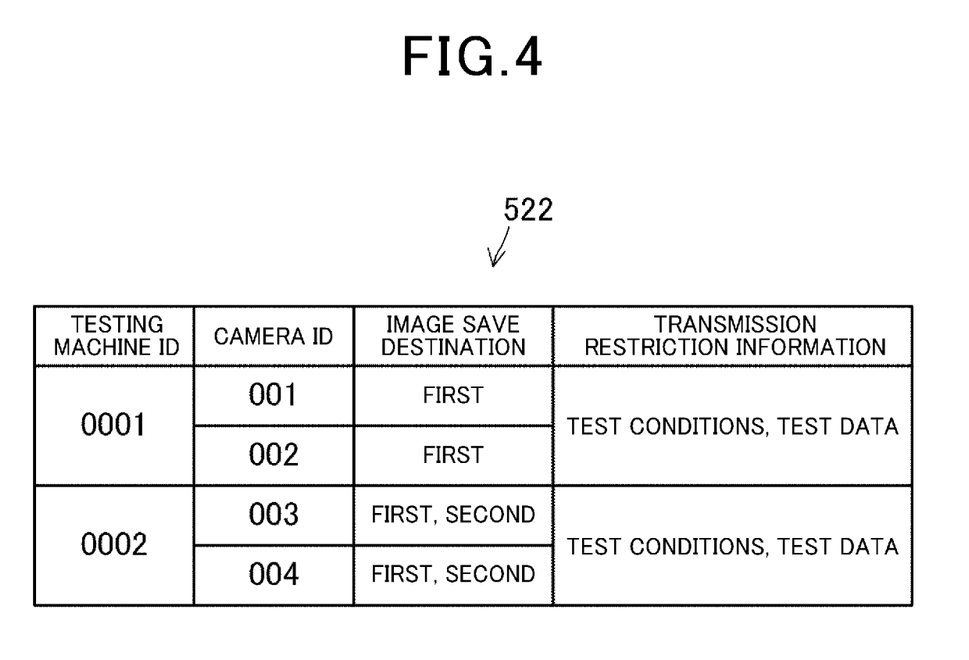
FIG. 4 is a schematic diagram illustrating an example of transmission setting data.

FIG. 4 is a schematic diagram illustrating an example of the transmission setting data 522.

As illustrated in FIG. 4, the transmission setting data 522 specifies an image save destination and transmission restriction information.

The image save destination is a storage unit in which the acquisition unit 512 stores the captured images. In the present embodiment, the image save destination are the first image storage unit 53 and the second image storage unit 63. The transmission setting data 522 in FIG. 4 specifies the image save destination associated with the camera ID. In the example of FIG. 4, the first image storage unit 53 is specified as the image save destination associated with the camera IDs 001 and 002. The transmission setting data 522 may specify the image save destination associated with the testing machine ID.

The transmission restriction information is restricted from being transmitted to the server device 6. In these cases, the information stored in the second image storage unit 63 needs to be protected from the viewpoint of information security. In order to protect the information stored in the second image storage unit 63, it is necessary to take measures to ensure a higher security level than the information stored in the first image storage unit 53. In other words, if the information that needs to be protected from the viewpoint of information security is not transmitted from the network NW1 to the server device 6, the necessity of processing for information protection can be reduced without causing a decrease in the confidentiality of the information and concerns in terms of security. Therefore, the management system 100 restricts the management device 5 from transmitting information of a specific type to the server device 6. The information to be restricted is defined as transmission restriction information in the transmission setting data 522. The transmission setting data 522 in FIG. 4 specifies the transmission restriction information associated with the testing machine ID. This is an example, and the transmission restriction information may be set for the entire management system 100 or may be specified in association with the camera ID.

In the example of FIG. 4, the transmission restriction information is the test conditions in the fatigue testing machine 1 and the test data obtained by the fatigue testing machine 1 testing the specimen SP. If the captured image acquired by the acquisition unit 512 from the camera 3 contains the transmission restriction information, transmission of this captured image to the server device 6 is restricted. There are no restrictions on the type and number of transmission restriction information.

Figure 5:
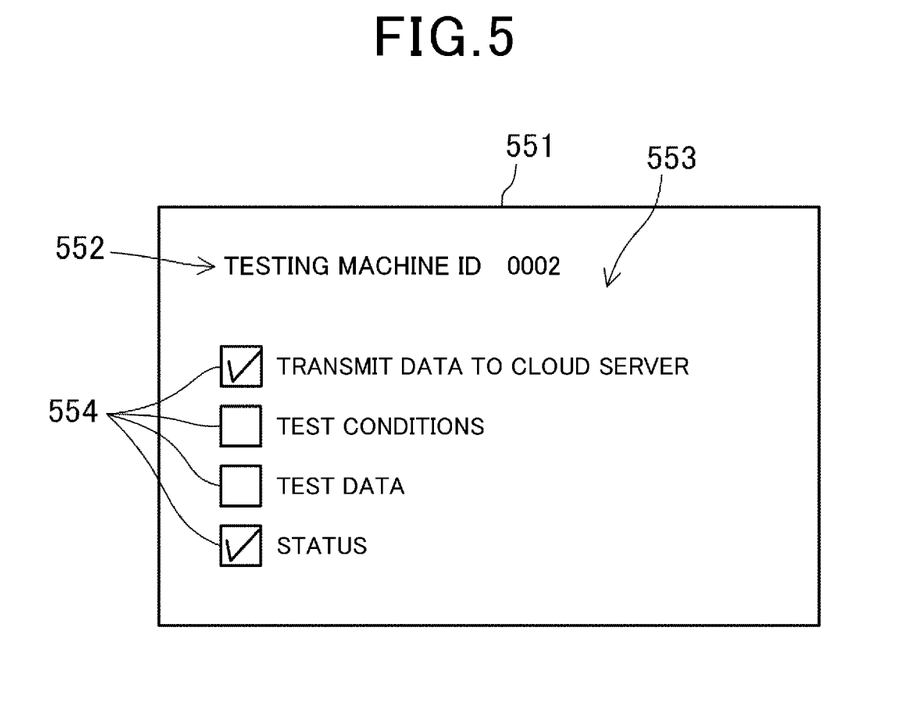
FIG. 5 illustrates an example of a setting screen.

FIG. 5 illustrates an example of a setting screen 551. The setting screen 551 is displayed on the display unit 55 under the control of the setting unit 514.

On the setting screen 551, a testing machine ID display section 552 and an item display section 553 are arranged. The testing machine ID display section 552 displays the testing machine ID of the fatigue testing machine 1 to be set. The item display section 553 displays candidates for the transmission restriction information. In the example illustrated in FIG. 5, the candidates for the transmission restriction information are items indicating the type of information. In the item display section 553, a check box 554 is disposed for each item. The setting unit 514 displays a check mark in the check box 554 on the basis of the input accepted by the input unit 54 while the setting screen 551 is being displayed.

In the example of FIG. 5, the items displayed on the item display section 553 include transmitting data to the server device 6. In a case where the check box 554 for this item is checked, the data-processing unit 513 is permitted to transmit the captured image to the server device 6. In this case, the first image storage unit 53 and the second image storage unit 63 are set as the image transmission destination of the transmission setting data 522.

In addition, in a case where the check box 554 is not checked, transmission of the captured image to the server device 6 is itself restricted. In this case, only the first image storage unit 53 is set as the image transmission destination of the transmission setting data 522.

In the item display section 553, test conditions, test data, and status are displayed as candidates of the transmission restriction information. The status indicates the operating state of the fatigue testing machine 1. The items with a check mark in the check box 554 among the items in the item display section 553 are permitted to be transmitted to the server device 6. That is, the items with no check mark in the check box 554 are the transmission restriction information.

The setting unit 514 generates the testing machine ID display section 552 or updates the testing machine ID display section 552 on the basis of the presence or absence of the check mark on the setting screen 551.

The image-processing unit 515 executes image processing on the captured image acquired by the acquisition unit 512. Specifically, if the captured image to be transmitted to the server device 6 by the data-processing unit 513 contains the transmission restriction information specified by the transmission setting data 522, the image-processing unit 515 executes image processing for reducing the readability of the transmission restriction information. The image processing for reducing the readability of the transmission restriction information includes, for example, extraction processing for extracting the portion of the captured image in which the transmission restriction information is shown. Furthermore, the image processing includes mosaic processing for mosaicing the portion extracted in the extraction processing, processing for filling the extracted portion with a single color or a plurality of colors, mask processing for overlaying a mask image on the extracted portion to form a composite image, and the like.

Figure 6:
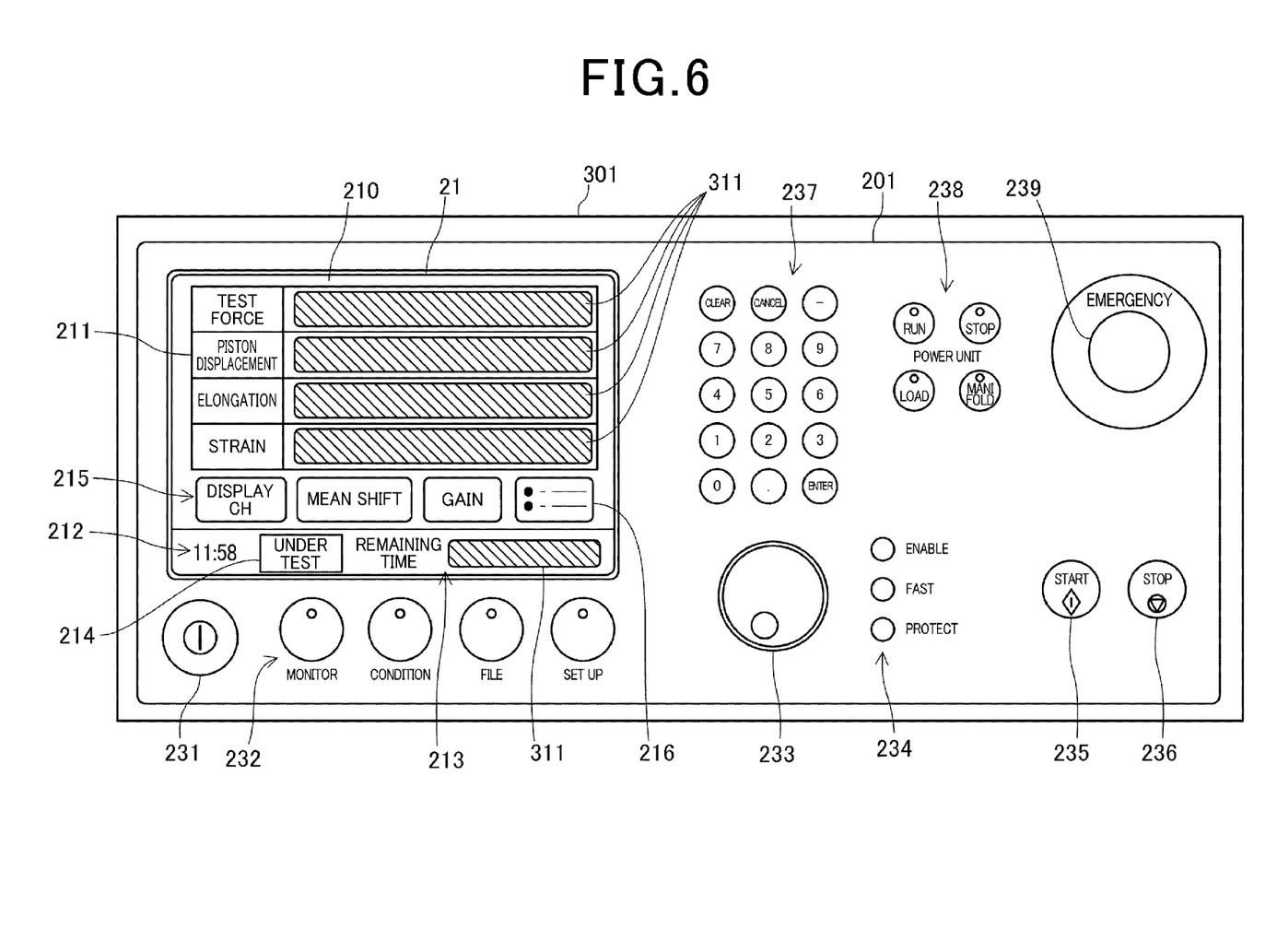
FIG. 6 illustrates an example of a captured image.

FIG. 6 illustrates an example of a captured image 301, which is an example of the captured image processed by the image-processing unit 515.

The captured image 301 is an image of the imaging range PA3 illustrated in FIG. 2, and shows a front panel 201 of the control device 20. The display 21 is disposed on the front panel 201, and a test state screen 210 is displayed on the display 21.

The test state screen 210 includes a test data display section 211, a time display section 212, a test time display section 213, a status display section 214, a display switching section 215, and a display switching button 216. The test data display section 211 displays the data detected in the test of the specimen SP. The time display section 212 displays the current time. The test time display section 213 displays the remaining time of the test being executed. The status display section 214 displays the operating state of the fatigue testing machine 1. The display switching section 215 displays the display switching button 216 and the like for switching the screen displayed on the display 21 from the test state screen 210 to another screen. A touch sensor (not illustrated) that detects a user's touch operation is overlaid on the display 21. Upon detecting a touch operation on the display switching button 216, the control device 20 switches the display of the entire test state screen 210 or the test data display section 211.

The information displayed in the test data display section 211 corresponds to the test data. The remaining time displayed in the test time display section 213 corresponds to the test conditions. The information displayed in the status display section 214 corresponds to the status.

In the example of FIG. 6, a mask image 311 is overlaid on the test data displayed in the test data display section 211 and the test conditions displayed in the test time display section 213 among the information displayed on the test state screen 210. Since the mask image 311 constitutes a part of the captured image 301, even if the mask image 311 is removed from the captured image 301, the test data and the test conditions remain unreadable.

As illustrated in FIG. 6, the captured image 301 not containing the transmission restriction information is obtained by image processing for making the transmission restriction information included in the captured image acquired by the acquisition unit 512 difficult to read.

The captured image 301 shows various switches and the like arranged on the front panel 201. For example, a power switch 231 for turning on/off the power supply of the fatigue testing machine 1, function keys 232 for instructing the control device 20 to execute specific functions, and a dial 233 used for changing settings and other operations are arranged on the front panel 201. In addition, setting keys 234 for setting the operation of the control device 20, a test operation key 235 for instructing the start of testing by the fatigue testing machine 1, a test operation key 236 for instructing the stop of testing by the fatigue testing machine 1, and a numeric keypad 237 for inputting numerical values are arranged on the front panel 201. Further, power unit operation keys 238 for operating the hydraulic power supply connected to the testing machine body 10, and an emergency stop switch 239 for emergently stopping the fatigue testing machine 1 are arranged on the front panel 201. Some of the switches and the like arranged on the front panel 201 are provided with light emitting diode (LED) indicators. The lighting state of the LED indicators may indicate the operating state and the test conditions of the fatigue testing machine 1.

In the captured image 301, the object to be subjected to image processing by the image-processing unit 515 is not limited to the image on the display 21. For example, the image-processing unit 515 may perform image processing to overlay the mask image 311 on the switches or the like of the front panel 201. In this case, the image-processing unit 515 can make the LED indicators on the front panel 201 unreadable. Thus, if the information indicated by the LED indicators corresponds to the transmission restriction information, the captured image 301 not containing the transmission restriction information can be provided.

As described above, the data-processing unit 513 stores the captured image acquired by the acquisition unit 512 in the image save destination defined by the transmission setting data 522. In a case where the image save destination includes the second image storage unit 63, the data-processing unit 513 transmits, to the server device 6, the captured image and a command instructing to store the captured image in the second image storage unit 63. The server device 6 receives the captured image from the management device 5, and stores the received captured image in the second image storage unit 63.

In a case where the captured image acquired by the acquisition unit 512 contains the transmission restriction information, the acquisition unit 512 cannot transmit the captured image to the server device 6. In this case, the management device 5 executes image processing on the captured image by the image-processing unit 515. The captured image in which the transmission restriction information is made difficult to read by image processing can be regarded as substantially containing no transmission restriction information. The acquisition unit 512 transmits the captured image after the image processing to the server device 6.

The captured image transmitted to the server device 6 is associated with, for example, the testing machine ID and stored in the second image storage unit 63. The captured image stored in the second image storage unit 63 can be viewed by the user terminal 7.

Figure 7:
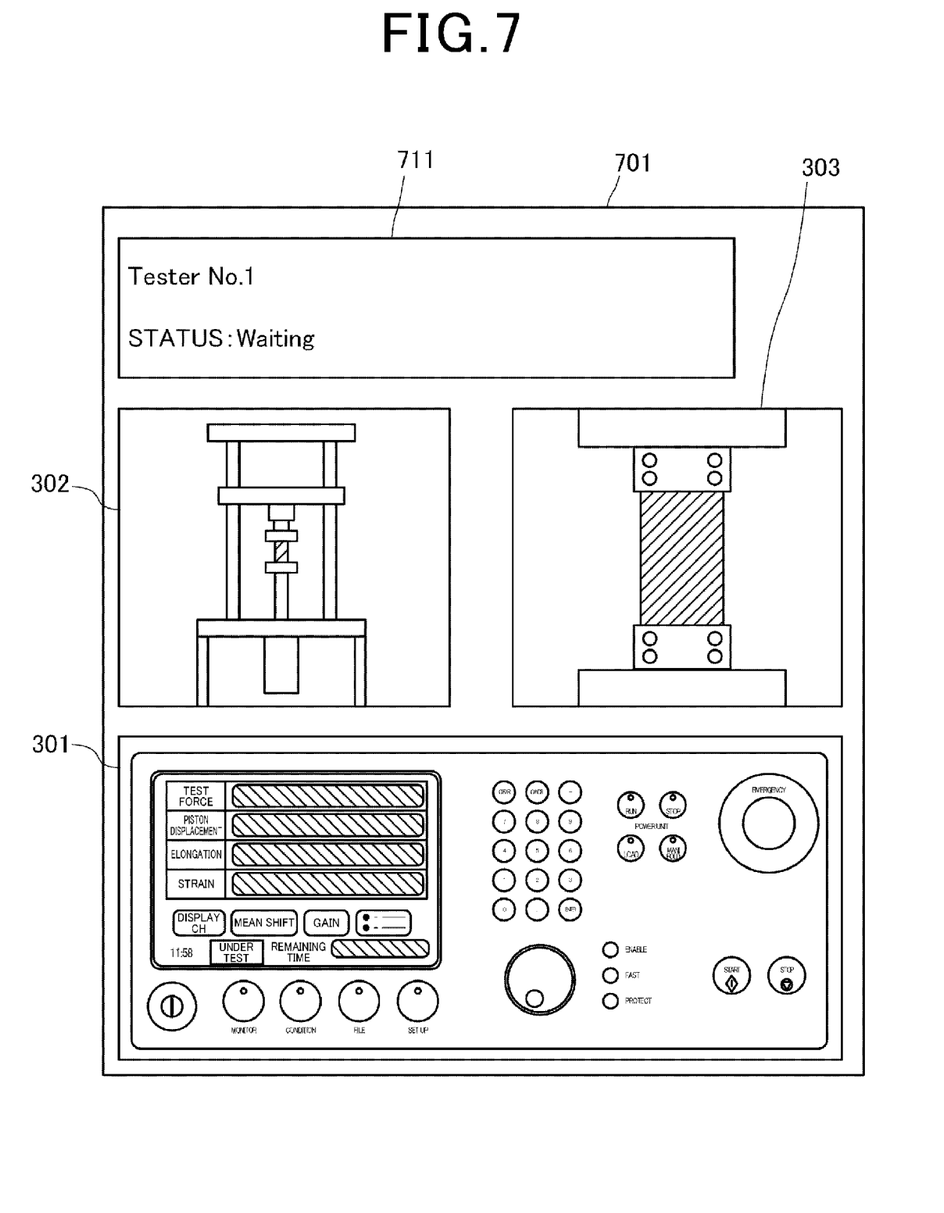
FIG. 7 illustrates an example of a management screen displayed by a user terminal.

FIG. 7 illustrates an example of a management screen 701 displayed by the user terminal 7.

On the management screen 701, a testing machine information display section 711 and one or more captured images are arranged. In the example of FIG. 7, captured images 301, 302, and 303 are arranged on the management screen 701. The captured image 302 is an image of the imaging range PA1. The captured image 303 is an image of the imaging range PA2. The captured image 301 is the image after image processing by the image-processing unit 515, and the test data and the test conditions are mask processed.

The user terminal 7 displays the management screen 701, thereby allowing the user to manage the situation of testing by the fatigue testing machine 1. Since the network NW2 is a wide area communication network, the user who uses the user terminal 7 can manage the state of testing by the fatigue testing machine 1 at a location away from the testing machine installation area A1. In addition, if the second image storage unit 63 is configured so as to store captured images for a predetermined period, the images captured in the past can be viewed from the user terminal 7. Consequently, the captured images stored in the second image storage unit 63 can be used as a record of tests executed by the fatigue testing machine 1 in the past. For example, the user can check the operating state of the fatigue testing machine 1 from the status display section 214 on the captured image 301 and the states of the LED indicators of the switches. The user can also check the state of the specimen SP on the basis of the captured images 302 and 303. These checks can be performed without the user going to the installation location of the fatigue testing machine 1. Thus, it is possible to reduce the user's efforts required for managing the fatigue testing machine 1.

Furthermore, in the management system 100, the information provided by the server device 6 to the user terminal 7 is the images captured by the camera 3. The captured images are not easy to divert and falsify as compared with the numerical data related to the tests executed by the fatigue testing machine 1 or the status of the fatigue testing machine 1. Therefore, there is an advantage that there is less concern in terms of security than a case where numerical data can be accessed from outside the testing machine installation area A1. Furthermore, by using the images captured by the camera 3, the management system 100 can achieve the management of the fatigue testing machine 1 without connecting the control device 20 to the network NW1. Consequently, even if the fatigue testing machine 1 does not have the function of connecting to the network NW1, the fatigue testing machine 1 can be managed by the management system 100.

4. Operation of Management System

Figure 8:
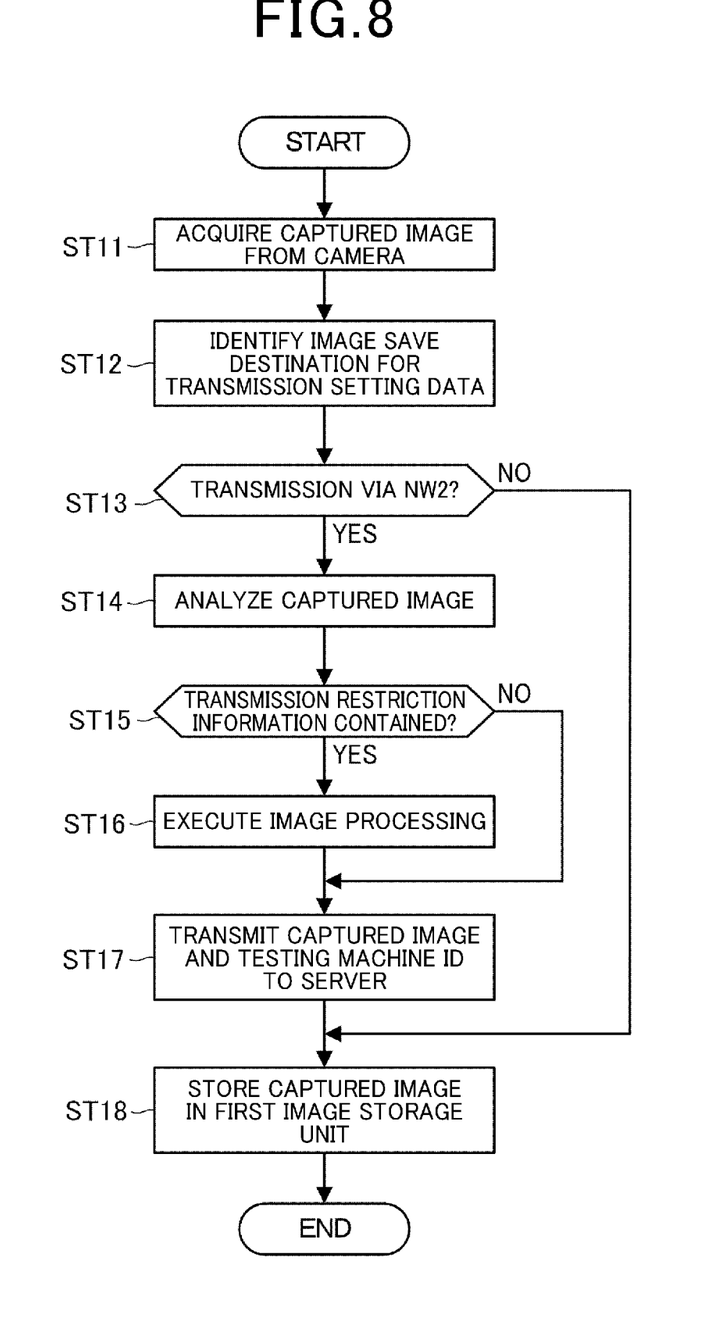
FIG. 8 is a flowchart illustrating an example of the operation of a management device.

FIG. 8 is a flowchart illustrating an example of the operation of the management device 5.

In step ST11, the management device 5 causes the acquisition unit 512 to acquire a captured image from the camera 3. The management device 5 temporarily stores the captured image acquired by the acquisition unit 512 in the memory 52, for example.

In step ST12, the management device 5 causes the data-processing unit 513 to identify the image save destination specified by the transmission setting data 522. In step ST13, the management device 5 causes the data-processing unit 513 to determine whether to transmit the captured image via the network NW2 on the basis of the image save destination identified in the step ST12.

If the captured image is not transmitted via the network NW2 (step ST13; NO), the management device 5 proceeds to step ST18 described later.

If the captured image is transmitted via the network NW2 (step ST13; YES), the management device 5 proceeds to step ST14. In step ST14, the management device 5 causes the data-processing unit 513 to analyze the captured image. In step ST15, the management device 5 determines whether or not the captured image contains the transmission restriction information on the basis of the analysis result.

If the captured image does not contain the transmission restriction information (step ST15; NO), the management device 5 proceeds to step ST17 described later.

If the captured image contains the transmission restriction information (step ST15; YES), the management device 5 proceeds to step ST16. In the step ST16, the management device 5 causes the image-processing unit 515 to execute image processing on the captured image. The image processing in the step ST16 reduces readability of the transmission restriction information. After executing the image processing, the management device 5 proceeds to step ST17.

In the step ST17, the management device 5 causes the data-processing unit 513 to transmit the captured image determined not to contain the transmission restriction information in the step ST15 or the captured image subjected to the image processing in the step ST16 to the server device 6. In the step ST17, the data-processing unit 513 transmits the captured image and the captured testing machine ID of the fatigue testing machine 1 to the server device 6, and stores the captured image associated with the testing machine ID in the second image storage unit 63.

In addition, in step ST18, the management device 5 causes the data-processing unit 513 to store the captured image acquired in the step ST11 in the first image storage unit 53. Since the first image storage unit 53 is provided in the management device 5 connected to the network NW1, there is no need to conceal the transmission restriction information.

In the operation illustrated in FIG. 8, the management device 5 may omit the image processing in the step ST16. Specifically, if it is determined in the step ST15 that the captured image contains the transmission restriction information (step ST15; YES), the management device 5 proceeds to the step ST18 without performing the processing in the steps ST16 and ST17. In this case, since the captured image containing the transmission restriction information is not transmitted outside the network NW1, the confidentiality of the transmission restriction information can be ensured. In addition, since the image processing is not performed on the captured image, the processing load of the management device 5 can be reduced.

Figure 9:
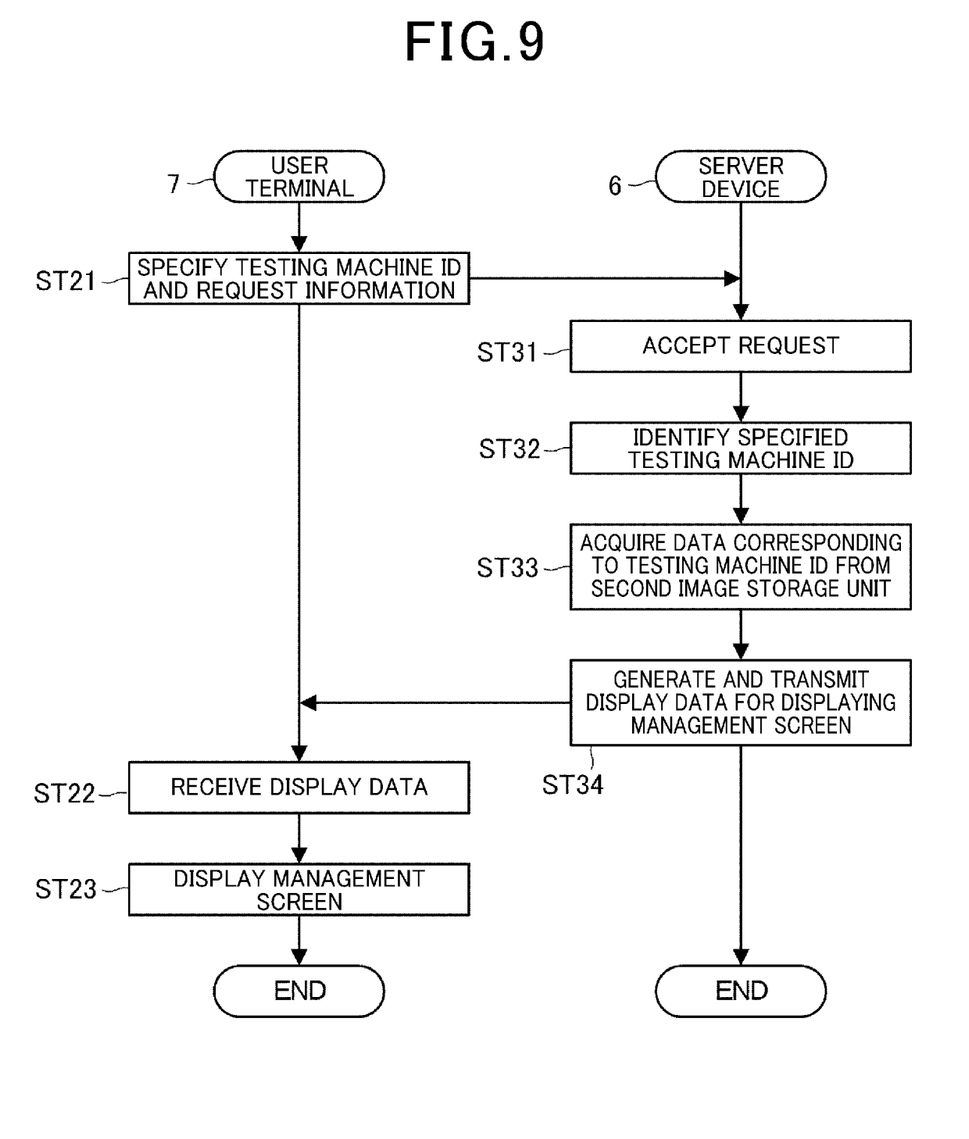
FIG. 9 is a flowchart illustrating an example of the operation of a server device and the user terminal.

FIG. 9 is a flowchart illustrating an example of the operation of the server device 6 and the user terminal 7. Steps ST21 to ST23 are the operation of the user terminal 7, and steps ST31 to ST34 are operation of the server device 6.

In the step ST21, the user terminal 7 accesses the server device 6 in response to a user's operation, specifies the testing machine ID, and requests information related to the fatigue testing machine 1.

In the step ST31, the server device 6 accepts the request from the user terminal 7. In the step ST32, the server device 6 identifies the testing machine ID specified by the user terminal 7. In the step ST33, the server device 6 acquires data corresponding to the identified testing machine ID from the second image storage unit 63. The data acquired by the server device 6 in the step ST33 is, for example, the data of the captured images 301, 302, and 303.

In the step ST34, the server device 6 generates display data for causing the user terminal 7 to display the management screen 701 containing the data acquired in the step ST33, and transmits the display data to the user terminal 7.

In the step ST22, the user terminal 7 receives the display data transmitted by the server device 6. In the step ST23, the user terminal 7 displays the management screen 701 on the basis of the display data received in the step ST22.

As described above, in the management system 100, an image of the fatigue testing machine 1 is captured by the camera 3, and the captured image is stored in the first image storage unit 53 and/or the second image storage unit 63. This allows the user to visually check the operating state of the fatigue testing machine 1, the progress state of the test, the state of the specimen SP, and the like by referring to the captured image stored in the first image storage unit 53 or the second image storage unit 63, without the user going to the installation location of the fatigue testing machine 1. Consequently, the burden on the user required to manage the fatigue testing machine 1 can be reduced.

The captured image stored in the first image storage unit 53 can be viewed from another equipment connected to the network NW1. For example, in response to an access from equipment such as a personal computer, a tablet computer, or a smartphone connected to the network NW1, the management device 5 transmits the captured image stored in the first image storage unit 53 to the equipment via the communication interface 56. This allows the user who manages the fatigue testing machine 1 to visually manage, using equipment connectable to the network NW1, the state of the fatigue testing machine 1 without going to the installation location of the fatigue testing machine 1.

The first image storage unit 53 is a closed communication network installed in the testing machine installation area A1. Therefore, in a state where the images captured by the camera 3 are stored in the first image storage unit 53, it is possible to maintain the confidentiality of information related to the fatigue testing machine 1. Consequently, it is possible to achieve the management of the fatigue testing machine 1 using the images captured by the camera 3 while ensuring the information security.

In a case where the management system 100 stores the captured images of the imaging range PA3 including the display 21 of the control device 20 in the first image storage unit 53 or the second image storage unit 63, the user can know the content displayed by the control device 20 from the captured images stored in the first image storage unit 53 or the second image storage unit 63. Consequently, the user can finely manage the state of the fatigue testing machine 1 in detail without going to the installation location of the control device 20.

The management system 100 uses the images captured by the camera 3 as information for managing the fatigue testing machine 1. Therefore, it is not necessary to directly acquire data related to the operating state and the like of the fatigue testing machine 1 from the fatigue testing machine 1. Consequently, the management system 100 according to the present embodiment can be applied to the fatigue testing machine 1 having no function of transmitting information related to the fatigue testing machine 1 by data communication, to perform management. In addition, the images captured by the camera 3 are more difficult to divert and falsify than the numerical values and text data related to the fatigue testing machine 1. Consequently, there is an advantage that there is no concern in terms of security when managing the fatigue testing machine 1.

The management system 100 can store the images captured by the camera 3 in the second image storage unit 63. The captured images stored in the second image storage unit 63 by the management system 100 are subjected to image processing for reducing readability of the transmission restriction information by the image-processing unit 515. Consequently, it is possible to store the captured image in the second image storage unit 63 that is accessible from outside the testing machine installation area A1, while ensuring the information security. Thus, the fatigue testing machine 1 can be managed from outside the testing machine installation area A1.

The management system 100 can set the transmission restriction information by means of the setting unit 514. For example, the setting unit 514 uses the setting screen 551 to set the transmission restriction information associated with the testing machine ID and the camera ID and set the set content as the transmission setting data 522. Therefore, the information to be transmitted outside the testing machine installation area A1 via the network NW2 can be finely managed for each fatigue testing machine 1 or for each camera 3.

5. Aspects and Effects

It is understood by those skilled in the art that the above-described present embodiment is a specific example of the following aspects.

(Item 1)

A management device for a material testing machine according to a first aspect includes: an acquisition unit that acquires at least either a captured image of a material testing machine body or a captured image of a control device that causes the material testing machine body to execute a test; and a data-processing unit that associates the captured image with the material testing machine and stores a result in an image storage unit.

With the management device for a material testing machine described in Item 1, since the captured image of the material testing machine body or the control device is stored, the user can check the state of the material testing machine by viewing the captured image. Therefore, the user can manage the state of the material testing machine without going to the installation location of the material testing machine. Consequently, the burden on the user required for managing the material testing machine can be reduced.

(Item 2)

The management device for a material testing machine according to Item 1, in which the control device is provided with a display screen and causes the display screen to display a state of execution of the test by the material testing machine, and the acquisition unit acquires an image captured by a camera having an imaging range that includes the display screen of the control device.

With the management device for a material testing machine described in Item 2, the captured image of the display screen of the control device that controls the material testing machine is stored in the image storage unit. Therefore, the user can know the content displayed by the control device from the captured image stored in the image storage unit. Consequently, by using the captured image of the display screen, the state of the material testing machine can be finely managed without the user going to the installation location of the control device.

(Item 3)

The management device for a material testing machine according to Item 1 or 2, in which the material testing machine body includes a first material testing machine body and a second material testing machine body, the control device includes a first control device and a second control device, and the acquisition unit acquires at least either a captured image of the first material testing machine body or a captured image of the first control device and acquires at least either a captured image of the second material testing machine body or a captured image of the second control device.

With the management device for a material testing machine described in Item 3, for each of the plurality of material testing machines, a captured image of the material testing machine body or the control device is stored in the image storage unit. This allows the user to manage the plurality of material testing machines with less effort by using the management system.

(Item 4)

The management device for a material testing machine according to any one of Items 1 to 3, in which the image storage unit includes a first image storage unit that is included in a first storage device connected to the management device via a local network, or in the management device, and a second image storage unit that is included in a second storage device connected to the management device via a wide area communication network, and the data-processing unit executes first data processing for associating the captured image with the material testing machine and storing the result in the first image storage unit, and second data processing for transmitting identification information of the material testing machine and the captured image to the second storage device.

With the management device for a material testing machine described in Item 4, the captured image of the material testing machine is stored in the first image storage unit included in the device connected to the local network and the second image storage unit included in the device connected to the wide area communication network. This allows a user to manage the material testing machine by viewing the captured image from a location connectable to the local network as well as from a location connectable to the wide area communication network. Consequently, the geographical restriction of the user who manages the material testing machine can be relaxed, and the burden on the user can be further reduced.

(Item 5)

The management device for a material testing machine according to Item 4, including a setting unit that sets transmission restriction information that is not permitted to be transmitted to the second storage device, in which in the second data processing, the data-processing unit transmits, to the second storage device, the captured image that does not contain the transmission restriction information.

With the management device for a material testing machine described in Item 5, transmission restriction information not permitted to be transmitted via the wide area communication network can be set. The captured image that does not contain the transmission restriction information is transmitted over the wide area communication network and stored in the second image storage unit. Thus, it is possible to ensure confidentiality by specifying information included in the captured image. In addition, the captured image that does not contain the transmission restriction information can be stored in the second image storage unit and used for the management of the material testing machine.

(Item 6)

The management device for a material testing machine according to Item 5, including an image-processing unit that executes image processing to reduce readability of the transmission restriction information on the captured image, in which the data-processing unit transmits, to the second storage device, the captured image subjected to the image processing by the image-processing unit.

With the management device for a material testing machine described in Item 6, the transmission restriction information not permitted to be transmitted via the wide area communication network can be concealed by image processing. This allows the captured image containing the transmission restriction information to be transmitted over the wide area communication network while maintaining the confidentiality of the transmission restriction information. Consequently, it is possible to achieve the management of the material testing machine using the wide area communication network while ensuring information security.

(Item 7)

The management device for a material testing machine according to Item 5, in which the data-processing unit does not transmit, to the second storage device, the captured image that contains the transmission restriction information among the captured images acquired by the acquisition unit.

With the management device for a material testing machine described in Item 7, since the captured image containing the transmission restriction information is not transmitted over the wide area communication network, the confidentiality of the information can be more reliably ensured.

(Item 8)

A management system for a material testing machine according to a second aspect includes: an imaging unit including at least either a first camera that captures an image of a material testing machine body or a second camera that captures an image of a control device that causes the material testing machine body to execute a test; an acquisition unit that acquires a captured image from the imaging unit; an image storage unit; and a data-processing unit that associates the captured image acquired by the acquisition unit with the material testing machine and stores a result in the image storage unit. In response to a request from a terminal device, the captured image stored in the image storage unit is transmitted to the terminal device.

With the management system for a material testing machine described in Item 8, advantageous effects similar to those of the management device for a material testing machine described in Item 1 are achieved. Further, the management system for a material testing machine described in Item 8 provides the captured image stored in the image storage unit to the terminal device, in response to a request from the terminal device. This allows the user to manage the material testing machine with less effort by using the terminal device.

(Item 9)

A management method for a material testing machine according to a third aspect includes: acquiring at least either a captured image of a material testing machine body or a captured image of a control device that causes the material testing machine body to execute a test; associating the captured image with the material testing machine and storing a result in an image storage unit; and executing communication with a terminal device, and in response to a request from the terminal device, transmitting the captured image stored in the image storage unit to the terminal device.

With the management method for a material testing machine described in Item 9, advantageous effects similar to those of the management device for a material testing machine described in Item 1 are achieved. Further, the management method for a material testing machine described in Item 9 provides the captured image stored in the image storage unit to the terminal device, in response to a request from the terminal device. This allows the user to manage the material testing machine with less effort by using the terminal device.

6. Other Embodiments

Note that the management system 100 according to the present embodiment is merely an example of an aspect of the management system for a material testing machine according to the present disclosure, and can be arbitrarily modified and applied without departing from the gist of the present disclosure.

For example, in the above embodiment, the configuration in which the management device 5 is provided with the first image storage unit 53 has been described, but this is an example. A first storage device different from the management device 5 may be installed on the network NW1, and the first storage device may be provided with the first image storage unit 53. In this case, the management device 5 transmits the images captured by the camera 3 to the first storage device via the network NW1 and stores the images in the first image storage unit 53. Examples of the first storage device include a personal computer, a server computer, and a network attached storage (NAS).

In addition, for example, the fatigue testing machine 1 is an example of the material testing machine, and can be arbitrarily modified and applied without departing from the gist of the present disclosure. For example, instead of or in addition to the fatigue testing machine, a universal testing machine, a tensile testing machine, a compression testing machine, a bending testing machine, a torsion testing machine, a creep testing machine, a spring testing machine, an impact testing machine, a friction testing machine, a wear testing machine, a heat generation testing machine, and the like can be managed.

In addition, each functional unit illustrated in FIG. 3 is a functional configuration, and a specific implementation form is not particularly limited. That is, hardware individually corresponding to each functional unit does not necessarily need to be mounted, and it is of course possible to have a configuration in which the functions of a plurality of functional units are implemented by one processor executing a program. In addition, some of the functions implemented by software in the above embodiment may be implemented by hardware, or some of the functions implemented by hardware may be implemented by software.

In addition, the unit of processing in the flowchart illustrated in FIG. 8 is divided according to the principal content of processing in order to facilitate understanding of the processing by the management device 5. There is no limitation by the way the unit of processing illustrated in the flowchart of FIG. 8 or its name, and the processing can also be divided into more units of processing depending on the content of processing and can also be divided in such a manner that one unit of processing includes more processing steps. In addition, the order of processing in the above flowchart is not limited to the illustrated example.

The control program 521 that the management device 5 causes the processor 51 to execute can also be recorded in a computer-readable recording medium. As the recording medium, a magnetic or optical recording medium or a semiconductor memory device can be used. Specific examples thereof include portable or fixed recording media such as a flexible disk, an HDD, a compact disk read only memory (CD-ROM), a DVD, a Blu-ray (registered trademark) disc, a magneto-optical disk, a flash memory, and a card-type recording medium. Furthermore, the recording medium may be a non-volatile storage device such as a RAM, ROM, or HDD, which is an internal storage device included in the management device 5. In addition, the control program 521 may be stored in the server device or the like, and the control program 521 may be downloaded from the server device to the management device 5.

What is claimed is:

1. A management device for a material testing machine comprising:
    an acquisition unit that acquires captured image of a display screen of a control device that causes a material testing machine body to execute a test and to display a state of execution of the test by the material testing machine; and
    a data-processing unit that associates the captured image with the material testing machine and stores a result in an image storage unit,
    the acquisition unit acquires the captured image by a camera having an imaging range that includes the display screen of the control device,
    wherein the image storage unit includes a first image storage unit that is included in a first storage device connected to the management device via a local network, or in the management device, and a second image storage unit that is included in a second storage device connected to the management device via a wide area communication network,
    wherein the management device further comprises a setting unit that sets transmission restriction information that is not permitted to be transmitted to the second storage device from among test conditions, test data, and status that are included in the candidates of transmission restriction information and sets to transmit the captured image to the second storage device or not to transmit the captured image to the second storage device,
    wherein, when the setting unit sets to transmit the captured image to the second storage device, the data-processing unit executes first data processing for associating the captured image with the material testing machine and storing the result in the first image storage unit, and second data processing for transmitting identification information of the material testing machine and the captured image to the second storage device, when the setting unit sets not to transmit the captured image to the second storage device, the data-processing unit executes the first data processing, and
    in the second data processing, the data-processing unit transmits, to the second storage device, the captured image that does not contain the transmission restriction information.

2. The management device for a material testing machine according to claim 1, wherein the material testing machine body includes a first material testing machine body and a second material testing machine body, the control device includes a first control device and a second control device, and the acquisition unit acquires at least either a captured image of the first material testing machine body or a captured image of the first control device and acquires at least either a captured image of the second material testing machine body or a captured image of the second control device.

3. The management device for a material testing machine according to claim 1, comprising an image-processing unit that executes image processing to reduce readability of the transmission restriction information on the captured image, wherein the data-processing unit transmits, to the second storage device, the captured image subjected to the image processing by the image-processing unit.

4. The management device for a material testing machine according to claim 1, wherein the data-processing unit does not transmit, to the second storage device, the captured image that contains the transmission restriction information among the captured images acquired by the acquisition unit.

5. A management system for a material testing machine comprising:

an imaging unit including camera that captures an image of a display screen of a control device that causes a material testing machine body to execute a test and to display a state of execution of the test by the material testing machine;

an acquisition unit that acquires a captured image from the imaging unit;

an image storage unit; and a data-processing unit that associates the captured image acquired by the acquisition unit with the material testing machine and stores a result in the image storage unit, wherein the acquisition unit acquires the captured image by the camera having an imaging range that includes the display screen of the control device, and in response to a request from a terminal device, the captured image stored in the image storage unit is transmitted to the terminal device, wherein the image storage unit includes a first image storage unit that is included in a first storage device connected to the management device via a local network, or in the management device, and a second image storage unit that is included in a second storage device connected to the management device via a wide area communication network, wherein the management system further comprises a setting unit that sets transmission restriction information that is not permitted to be transmitted to the second storage device and sets to transmit the captured image to the second storage device or not to transmit the captured image to the second storage device, wherein, when the setting unit sets to transmit the captured image to the second storage device, the data-processing unit executes first data processing for associating the captured image with the material testing machine and storing the result in the first image storage unit, and second data processing for transmitting identification information of the material testing machine and the captured image to the second storage device, when the setting unit sets not to transmit the captured image to the second storage device, the data-processing unit executes the first data processing, and in the second data processing, the data-processing unit transmits, to the second storage device, the captured image that does not contain the transmission restriction information.

6. A management method for a material testing machine comprising:

acquiring a captured image of a display screen of a control device that causes a material testing machine body to execute a test and to display a state of execution of the test by the material testing machine;

associating the captured image with the material testing machine and storing a result in an image storage unit; and executing communication with a terminal device, and in response to a request from the terminal device, transmitting the captured image stored in the image storage unit to the terminal device, wherein the image storage unit includes a first image storage unit that is included in a first storage device connected to the management device via a local network, or in the management device, and a second image storage unit that is included in a second storage device connected to the management device via a wide area communication network, wherein the management method further comprises setting that sets transmission restriction information that is not permitted to be transmitted to the second storage device and sets to transmit the captured image to the second storage device or not to transmit the captured image to the second storage device, wherein, when the setting sets to transmit the captured image to the second storage device, the executing execute first data processing for associating the captured image with the material testing machine and storing the result in the first image storage unit, and second data processing for transmitting identification information of the material testing machine and the captured image to the second storage device, when the setting sets not to transmit the captured image to the second storage device, the executing executes the first data processing, and in the second data processing, the executing transmits, to the second storage device, the captured image that does not contain the transmission restriction information.

* * * * *